United States Patent [19]

Fukuda

[11] 4,442,911

[45] Apr. 17, 1984

[54] METHOD AND APPARATUS FOR CONTROLLING ZERO ADJUSTMENT OF WEIGHT SENSOR

[75] Inventor: Masao Fukuda, Shiga, Japan

[73] Assignee: Kabushiki Kaisha Ishida Koki Seisakusho, Kyoto, Japan

[21] Appl. No.: 357,755

[22] Filed: Mar. 12, 1982

[30] Foreign Application Priority Data

Mar. 14, 1981 [JP] Japan ................................. 56-37061

[51] Int. Cl.³ ..................... G01G 23/14; G01G 19/22; G01G 23/18
[52] U.S. Cl. ..................................... 177/165; 177/25; 177/46
[58] Field of Search ................... 177/50, 164, 165, 46, 177/25

[56] References Cited

U.S. PATENT DOCUMENTS

| | | | |
|---|---|---|---|
| 3,805,903 | 4/1974 | Muskat et al. | 177/50 |
| 3,916,173 | 10/1975 | Williams, Jr. et al. | 177/165 X |
| 4,029,162 | 6/1977 | Krolick et al. | 177/165 |
| 4,344,492 | 8/1982 | Hirano | 177/165 X |

Primary Examiner—George H. Miller, Jr.

[57] ABSTRACT

A method and apparatus for controlling the zero adjustment of weight sensors adapted to measure the weight of articles. A zero adjustment control operation performed by the method and apparatus of the invention is executed by (1) discriminating whether the zero point deviation of each weight sensor lies within preset allowed limits, (2) applying a zero adjustment to each weight sensor when the zero point deviation thereof lies with the allowed limits and generating a signal for inhibiting the zero adjustment when the zero point deviation lies outside of the allowed limits, (3) counting the number of times the zero adjustment inhibit signal is generated, and (4) comparing the counted value with a predetermined value to produce an alarm signal when the counted value and predetermined value coincide, whereby the zero adjustment of the weight sensor is controlled.

10 Claims, 5 Drawing Figures

METHOD AND APPARATUS FOR CONTROLLING ZERO ADJUSTMENT OF WEIGHT SENSOR

BACKGROUND OF THE INVENTION

This invention relates to a method and apparatus for controlling the zero adjustment of a weighing machine used in a combinatorial scale.

It is often required to accurately weigh articles, which have unit weights that differ from one to another, into fixed quantities while at the same time limiting the articles in number. Examples of such articles are vegetables and fruits, confectioneries, perishables, fabricated articles, etc. When weighing out such articles it is general practice to make use of a combinatorial scale that relies upon a computer. A scale of this type is referred to as a computer scale.

A computer scale, as illustrated in FIG. 1, is composed of a plurality of weighing machines $A_1, A_2, \ldots, A_n$, weighing hoppers $B_1, B_2, \ldots, B_n$ associated with respective ones of the weighing machines, a common guide chute C, a pool hopper D, and buckets E operatively associated with a packing machine or the like.

In the computer scale of this kind each of the weighing hoppers $B_1, B_2, \ldots, B_n$ are supplied with articles to be weighed. The articles in each hopper are then weighed, and different combinations of the weighed values are added in each weighing cycle, with the number of weighed values in each combination being either arbitrary or predetermined. The sum of the weights in each combination is compared with a set target weight, whereby the weight combination that gives the target weight or the value closest thereto is found for each weighing cycle. This combination of weights is referred to as the best combination. When the best combination is found in the manner described, only those weighing hoppers of the weighing machines that are specified by the best combination (in other words, the best combination of weighing hoppers) are opened in response to an electric signal, thereby discharging their contents into the common guide chute C which in turn guides the articles to the pool hopper D where they are collected. The pool hopper D is subsequently actuated to introduce the articles into the bucket E which carries the articles to the packing machine or the like.

In weighing articles using the aforementioned computer scale, a wide variety of matter such as powder, oil, salt and other residue orginating from the weighed articles attaches itself to the walls of the weighing hoppers $B_1, B_2, \ldots, B_n$. While the amount of such matter left clinging to a weighing hopper is extremely small for one weighing operation by that hopper, the total amount which can accumulate over a large number of weighing operations is significant. Accordingly, a computer scale incorporates an automatic zero adjustment circuit which automatically applies a zero adjustment to the weight sensors associated with the respective weighing hoppers. When a preset number of weighing operations have been performed, the automatic zero adjustment circuit is adapted to automatically adjust the zero point of the weight sensor belonging to the weighing hopper which has performed said preset number of weighing operations. The zero adjustment referred to here is for the purpose of setting the output value of a weight sensor to zero when the corresponding weighing hopper is empty. This output value of the weight sensor when the hopper is empty is referred to as the zero point deviation.

Often the articles which are to be weighed exhibit a viscose or sticky property and have a relatively large unit weight namely the weight of an individual article, such as pieces of uncooked meat. In weighing such articles there are instances where several pieces or portions thereof attach themselves to the walls of a weighing hopper, as occurs with the various residue mentioned above.

The weight of the discharged articles to be weighed is light because a portion is attached to and remains within the weighing hopper despite the fact that the computer scale has selected the best combination.

On the other hand, some of the residual articles remaining in the weighing hopper are present in the form of a mixture of articles so firmly attached that they are rarely peeled off by the conventional weighing operation of the aforesaid powder, oil and fats, gas, etc. (hereinafter referred to as gases) but are finally peeled off by cleaning agent, brushing or the like, and another part of the articles to be weighed remain attached without being discharged for a period of time due to a slight viscosity of the articles to be weighed, as described above.

In such a case, in the prior art method for controlling the zero adjustment, if the weighing hopper, in which the residue articles to be weighed remain, reaches the time for the zero adjustment, the automatic zero adjustment is effected. The output value of the weight sensor in the weighing hopper after discharge with the attached residue is subjected to the zero adjustment and becomes the weight of an empty hopper, that is, the amount of zero displacement is set, without discriminating whether the gases or attached residue is hard to peel off after the articles to be weighed have been discharged. If the weighing hopper whose weight sensor is zero-adjusted has an article or portion thereof clinging to it, weight, too, can be sensed correctly by the sensor only as long as the article remains attached. Since the clinging article's residue is comparatively heavy, and the viscosity slight however, it will almost never remain attached to the hopper permanently but will usually fall after the following weighing operation together with the other articles which are released from the hopper. It is obvious that an error will result when the zero adjustment is applied with articles or fragments thereof clinging to a weighing hopper, followed by the dislodging and dropping of said articles or fragments into the chute C. Specifically, the output of the weight sensor belonging to the weighing hopper from which the clinging matter has fallen will include an error $w_o$ which will prevail until the next zero adjustment, the error $w_o$ representing the weight of the formerly attached matter or residue. With the conventional zero adjustment method, in other words, there are cases where weighing cannot be performed with a high level of accuracy when the articles to be weighed remain in the hopper.

BRIEF SUMMARY OF THE INVENTION

Accordingly, an object of the present invention is to provide a method and apparatus for applying a zero adjustment to a weight sensor so that a weighing operation can be performed with great accuracy not only when residue such as powder, oil and salt which originate from the articles to be weighed attach themselves to the walls of a weighing hopper, but also when some of the articles themselves or fragments thereof become attached to the weighing hopper.

Another object of the present invention is to provide a method and apparatus for applying a zero adjustment to a weight sensor to prevent a significant deviation in the zero point when, following a zero adjustment which is performed while articles are clinging to a weighing hopper, said articles are dislodged and fall from the hopper.

Still another object of the present invention is to provide a method and apparatus for applying a zero adjustment to a weight sensor in such a manner that it is possible to distinguish between a variation in the zero point of the weight sensor caused by residue such as powder, oil or salt which originate from the articles to be weighed and which attach themselves to a weighing hopper, and a variation in the zero point of the weight sensor caused when the articles themselves become attached to the walls of the weighing hopper, whereby it is possible to execute a prescribed zero adjustment operation which conforms to the particular zero point variation.

Yet another object of the present invention is to provide a zero adjustment method and apparatus through which the operator is informed of the fact that articles are clinging to a weighing hopper by arranging it so that an alarm is issued when articles attach themselves to the hopper, or when the variation in the zero point remains unduly large even after the zero adjustment operation has been inhibited for a predetermined number of times.

According to the present invention, the foregoing and other objects are attained by providing a zero adjustment method and apparatus which utilize the fact that the attachment of the articles themselves to the walls of a weighing hopper gives rise to a variation in the zero point which is more sudden and pronounced than that which results when residue such as powder, oil or salt given off by the articles become attached to the hopper, the zero point variation in this latter case being comparatively gentle. More specifically, according to the present invention, the limits of the zero point deviation (namely the output of a weight sensor whose corresponding hopper is empty) are preset. When the zero point deviation of a particular weight sensor is found to exceed these limits, this is regarded as indicating that an article(s) is attached to the hopper. To inform the operator of this fact the arrangement is such that either an alarm is issued or the zero adjustment operation inhibited.

Other features and advantages of the invention will be apparent from the following description taken in conjunction with the accompanying drawings.

DESCRIPTION OF THE PREFERRED EMBODIMENT

Figure 1:
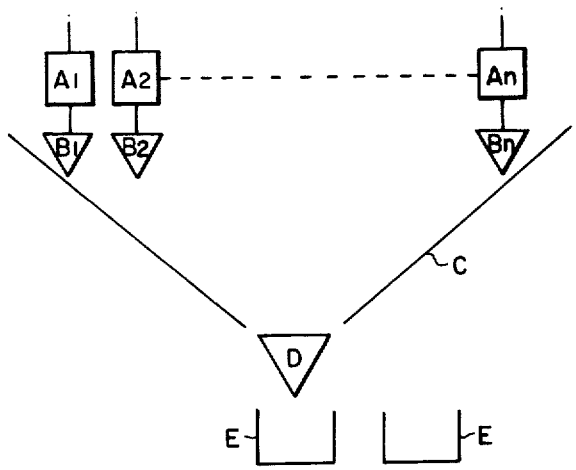
FIG. 1 is a diagram of the general features of a computer scale.
Figure 2:
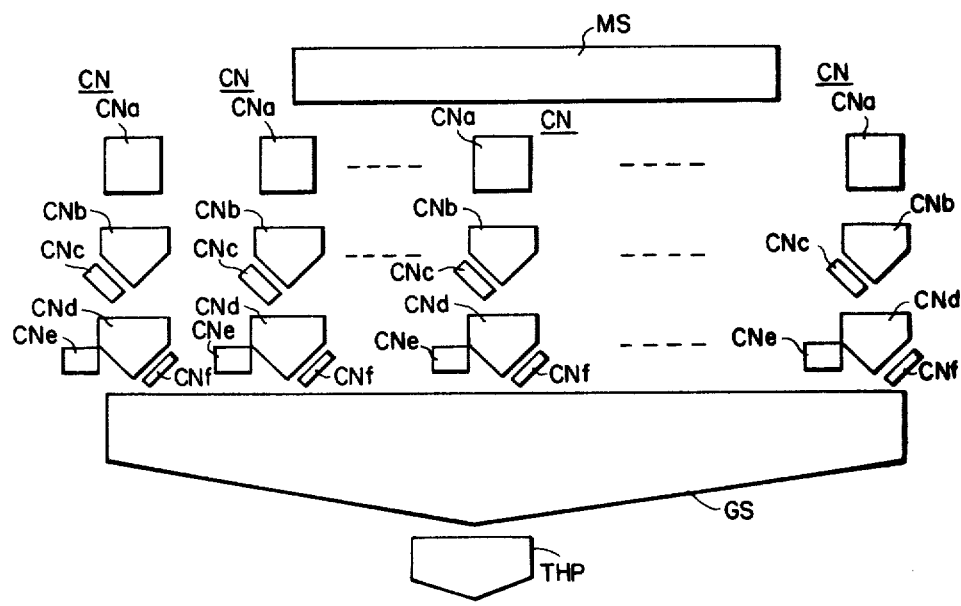
FIG. 2 is a diagram of the structure and operating principle of a computer scale to which the present invention can be applied.

Reference will now be had to FIG. 2 to describe the structure and operating principle of a computer scale to which the present invention can be applied.

FIG. 2, MS denotes a main feeder of a vibratory conveyance type. Articles to be weighed, which will be referred to hereinafter merely as "articles", are introduced into the main feeder MS and imparted with vibratory motion so as to be dispersed radially outward from the center of the main feeder. CN, CN, . . . denote n-number of weighing sections which are arranged around the main feeder MS along radially extending lines to receive the articles dispersed by the main feeder. Each weighing section CN includes a dispersing feeder $CN_a$, a holding vessel $CN_b$, a holding vessel gate $CN_c$, a weighing hopper $CN_d$, a weight sensor $CN_e$, and a weighing hopper gate $CN_f$. The dispersing feeder $CN_a$ comprises an independently vibratable conveyance device for feeding the articles by means of vibration, or an independently operable shutter device for delivering the articles in batches. In either case, each dispersing feeder $CN_a$ is so arranged that the articles received from the centrally located main feeder MS can be introduced into the corresponding holding vessel $CN_b$ disposed therebelow. The holding vessel gate $CN_c$ is provided on each holding vessel $CN_b$ in such a manner that the articles received in the holding vessel are released into the weighing hopper $CN_d$ when the gate $CN_c$ is opened. Each weight sensor $CN_e$ is attached to the corresponding weighing hopper $CN_d$ and is operable to measure the weight of the articles introduced into the weighing hopper. The weight sensor $CN_e$ is adapted to supply a combination control unit (not shown) with an electrical signal indicative of the measured weight. The combination control unit then selects the optimum combination of articles that gives a total weight closest to a target weight. Each of the weighing hopper gates $CN_f$ is provided on the corresponding weighing hopper $CN_d$. The combination control unit, upon receiving the signals from each of the weight sensors $CN_e$, responds by opening the weighing hopper gates $CN_5$ only of those weighing hoppers $CN_d$ that will give the optimum combination of articles, as mentioned above. The articles from the weighing hoppers $CN_d$ selected in this manner fall through the open weighing hopper gates and are discharged into a common collecting chute GS where they are collected together. The collecting chute GS has the shape of a funnel and is so arranged as to receive the articles from any of the circularly arrayed weighing hoppers $CN_d$ via the hopper gates, which are located above the funnel substantially along its outer rim. The articles received by the collecting chute GS are collected at the centrally located lower end thereof by falling under their own weight or by being forcibly shifted along the inclined wall of the funnel by a mechanical scraper or the like, which is not shown. The collecting chute GS is provided with a timing hopper THP at the lower end thereof for temporarily holding the collected articles. The arrival of an externally applied signal from a packing device or the like causes the timing hopper THP to release the retained articles from the weighing apparatus, namely from collecting chute GS which constitutes the lowermost stage of the apparatus, to a separate item of equipment, such as the packing device.

The operation of the above arrangement will now be described in greater detail. At the beginning the holding vessels $CN_b$ and weighing hoppers $CN_d$ contain a supply of the articles. The weight sensors $CN_e$ associated with the respective weighing hoppers $CN_d$ measure the weights of the articles in each hopper and produce weight values $W_1$ through $W_{10}$ which are sent to the combination control unit (not shown). The control unit performs an arithmetic combinatory control operation using the weight values $W_1$ through $W_{10}$ and selects the combination of articles that gives a total weight closest to the set target weight. A drive control unit (not shown) opens the weighing hopper gates $CN_f$ which are selected on the basis of the best combination, whereby the selected weighing hoppers discharge their articles into the collecting chute GS. This will leave the selected weighing hoppers $CN_d$ empty. Now the holding vessel gates $CN_c$ of those holding vessels $CN_b$ corresponding to the empty weighing hoppers $CN_d$ are opened to introduce a fresh supply of the articles into said weighing hoppers, leaving said holding vessels empty. Next, the dispersing feeders $CN_a$ which correspond to the empty holding vessels $CN_b$ are vibrated for a predetermined period of time to deliver a fresh supply of the articles to said holding vessels. This restores the weighing apparatus to the initial state to permit resumption of the control operation for selecting the optimum weight combinations in the manner described. Thus, weighing by the combinatorial scale may proceed in continuous fashion by repeating the foregoing steps.

Figure 3:
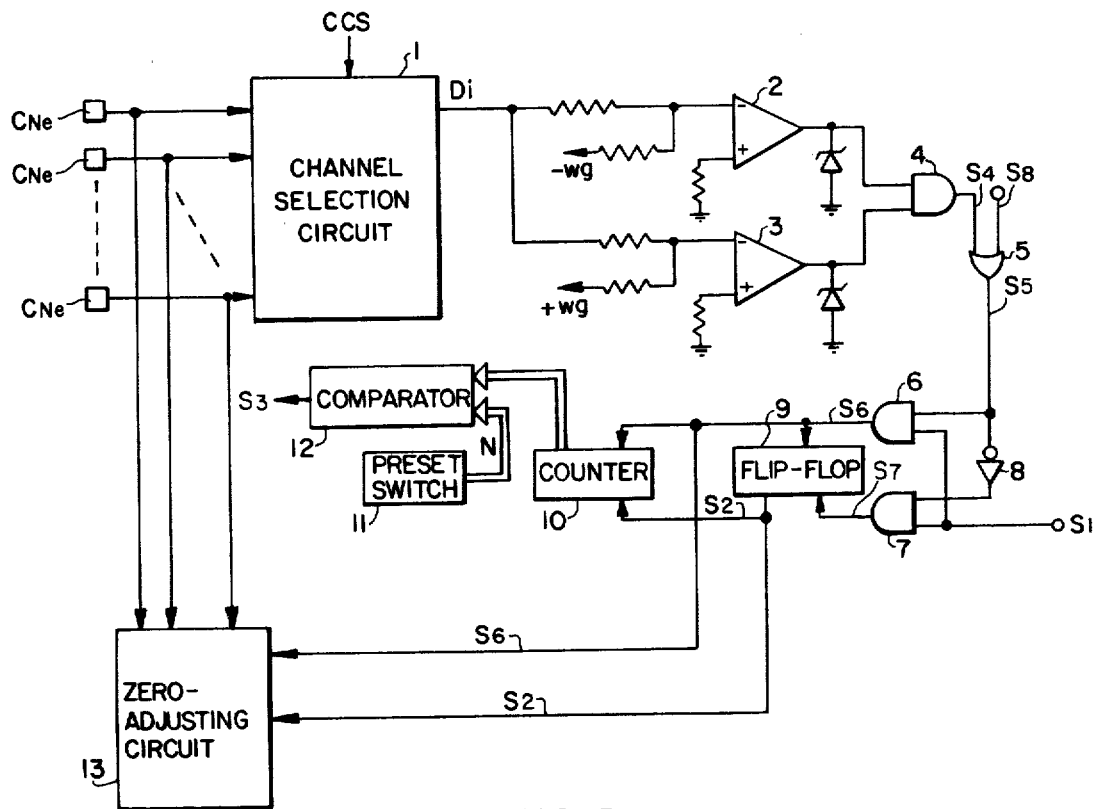
FIG. 3 is a block diagram of a zero adjustment control apparatus for practising the zero adjustment control operation of the present invention.
Figure 4:
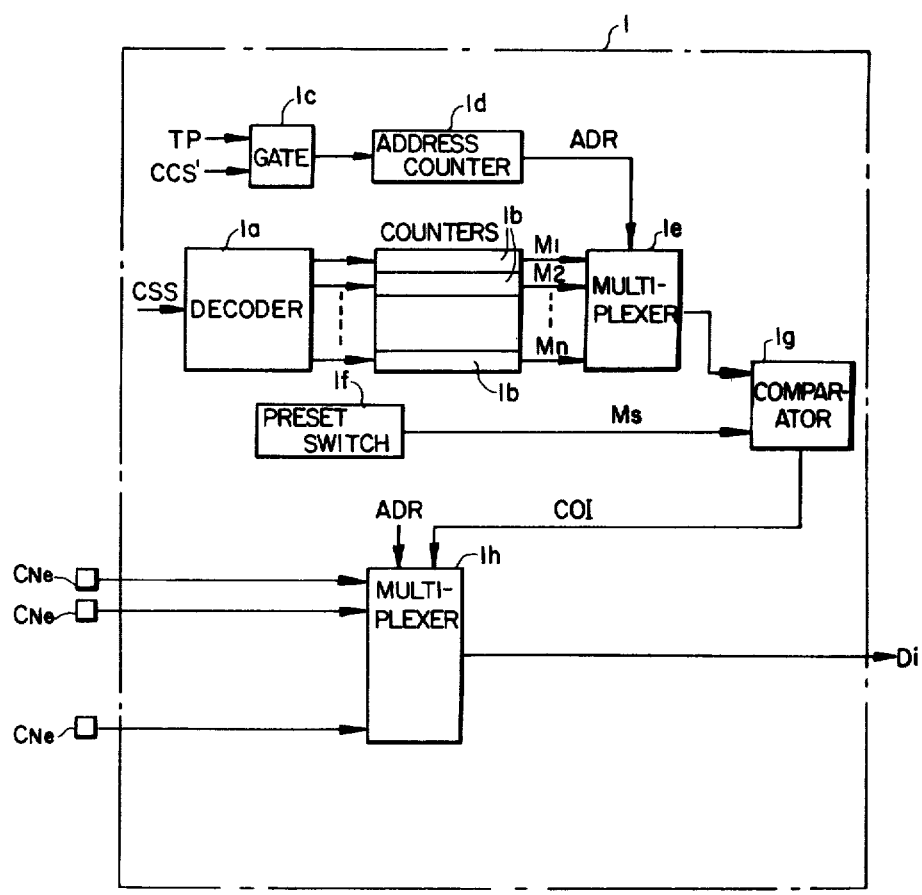
FIG. 4 is a block diagram of a channel selection circuit included in the zero adjustment control apparatus of FIG. 3.

FIG. 3 illustrates a preferred embodiment of a zero adjustment control apparatus according to the present invention. The apparatus includes a channel selection circuit 1 for selecting which of the plurality of weight sensors $CN_e$, $CN_e$, ... is to be subjected to a zero adjustment. FIG. 4 is a block diagram which illustrates the channel selection circuit 1 in greater detail.

Referring to FIG. 4, the channel selection circuit 1 is shown to include a decoder 1a for decoding a best combination code CCS provided by a combination control unit (not shown), a bank of counters 1b, 1b, ... provided for respective ones of the weight sensors $CN_e$, $CN_e$, ..., a gate 1c which opens to deliver a timing pulse TP in response to the generation of the best combination code CCS (that is, when a corresponding signal CCS' goes to logical "1"), an address counter 1d which counts the timing pulses TP to produce an address signal ADR, a multiplexer 1e for delivering the numerical value $M_i$ from the particular counter 1b specified by the address signal ADR, a preset switch 1f in which a predetermined numerical value $M_s$ is preset, a comparator 1g for comparing the numerical value $M_s$ and the output $M_i$ of the multiplexer 1e and for producing a coincidence signal COI when $M_s$ and $M_i$ coincide, and a multiplexer 1h operable when the coincidence signal COI is produced to deliver the output data (namely the zero point deviation) $D_i$ of the particular weight sensor $CN_e$ designated by the address signal ADR.

To describe the operation of the channel selection circuit 1 we will assume that the best combination code CCS has arrived from the combination control unit (not shown). Further, if the weighing hoppers (and hence the weight sensors) are n in number, then the best combination code CCS will be expressed as an n-bit binary code. Then, by establishing correspondance between the i-th (where i = 1, 2, ..., n) weighing hopper (weight sensor $CN_e$) and the i-th bit of said binary code, the best combination code CCS may be expressed in the form 0100100111, where the assumption is that there are ten weighing hoppers or weight sensors. The code 0100100111 indicates a combination made up of the second, fifth, eight, ninth and tenth weighing hoppers or weight sensors. The best combination code CCS is decoded by the decoder 1a to count up, by one step (i.e., +1), the numerical value in those counters 1b, 1b, ... corresponding to the weighing hoppers which have been selected as giving the best combination. When the best combination code CCS is generated, the corresponding signal CCS' goes to logical "1", opening the gate 1c so that the address counter 1d may start counting the timing pulses TP. Whenever a timing pulse arrives from the gate 1c the address signal ADR provided by the address counter 1d is incremented by one step, the multiplexer 1e responds by supplying the comparator 1g with the numerical value $M_1$, $M_2$, ..., $M_n$ from the counter 1b, 1b, ... specified by the address signal ADR, which counter corresponds to the 1st, 2nd, ..., n-th weight sensor $CN_e$, $CN_e$, ..., $CN_e$. Upon receiving the designated numerical value $M_i$ from the multiplexer 1e, the comparator 1g compares $M_i$ with the numerical value $M_s$ set in the preset switch 1f and, when they coincide, produces the coincidence signal COI and clears the counter which stores the value $M_i$. The multiplexer 1h responds to the coincidence signal COI by delivering the output data (the zero point deviation) $D_i$ of the weight sensor $CN_e$ designated by the address signal ADR.

The foregoing operation is repeated whenever the address signal ADR is incremented by the generation of a timing pulse TP, these being produced with a suitable periodicity. When this operation is completed for the numerical values $M_1$ through $M_n$ for all n of the counters 1b, this marks the end of one complete operating cycle of the channel selection circuit 1 based on the particular best combination code received by the decoder 1a.

In summary, then, the channel selection circuit 1 is so arranged that when a certain weighing hopper is selected a preset number of times $M_s$ (set in switch 1f) as being one which contributes to the best combination, the weight sensor associated with said hopper is designated and its output data, namely the zero point deviation $D_i$, is delivered to the circuitry connected to the output side of the selection circuit 1.

Returning now to FIG. 3, the zero adjustment control apparatus further includes comparators 2, 3 which receive the zero point deviation $D_i$ obtained from the weight sensor $CN_e$ selected by the channel selection circuit 1 in the manner described above. The comparators 2, 3 compare the magnitude of the zero point deviation $D_i$ with preset error limits $-w$ and $+w$ (in grams), respectively. A first AND gate 4 receives the output signals of the comparators 2, 3 and produces a pulse when these two outputs coincide. More specifically, the first AND gate 4 develops an output $S_4$ only when the zero point deviation $D_i$ from the selected weight sensor $CN_e$ is smaller than $+w$ grams and larger than $-w$ grams. The output $S_4$ of the AND gate 4 is applied to an OR gate 5 whose output $S_5$ is in turn connected to a second AND gate 6 which receives also a comparison end signal $S_1$ generated upon the completion of the comparison operation mentioned above. The AND gate 6 takes the AND of signals $S_1$, $S_5$. A third AND gate 7 receives the output $S_5$ of the OR gate 5 after inversion by an inverter 8, as well as the comparison end signal $S_1$, and is adapted to take the AND of these two signals. An R-S flip-flop 9 is cleared by the outputs $S_6$ of the second AND gate 6 and set by the output $S_7$ of the third AND gates 7 to produce a zero adjustment inhibit signal $S_2$. A counter 10 counts the number o times the zero adjustment inhibit signal $S_2$ is produced by the flip-flop 9. The counter 10 is cleared by the output $S_6$ of the second AND gate 6. A preset switch 11 is provided for setting a numerical value N which is applied to a comparison circuit 12 along with the output of the counter 10. The comparison circuit 12 issues an alarm signal $S_3$ when the numerical value N from the preset switch 11 and the numerical value supplied by the counter 10 coincide. Designated at numeral 13 is an automatic zero adjusting circuit which will be described in greater detail with reference to FIG. 5.

Figure 5:
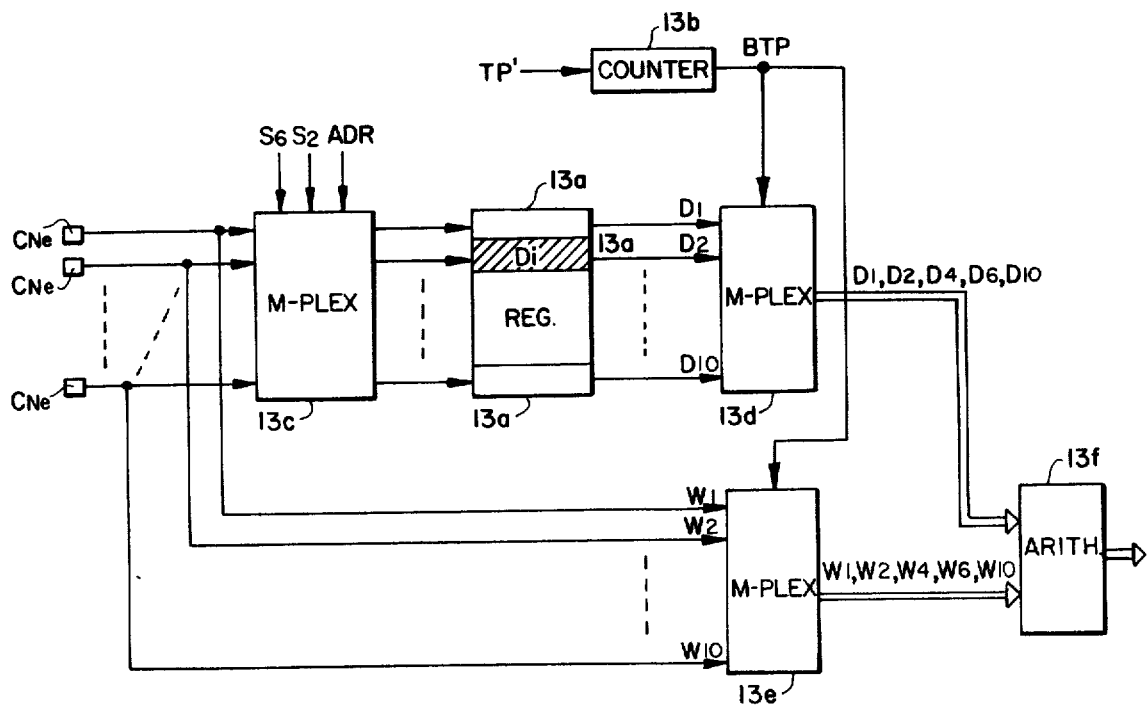
FIG. 5 is a block diagram of an automatic zero adjusting circuit included in the zero adjustment control apparatus of FIG. 3.

In FIG. 5 the automatic zero adjusting circuit 13 is shown to include n-number of registers $13a, 13a, \ldots$ provided for respective ones of the weight sensors $CN_e, CN_e, \ldots$, a counter $13b$ for generating all possible combinations of the n-number of weight sensors $CN_e, CN_e, \ldots$, these combinations being $2^n - 1$ in number, multiplexers $13c, 13d, 13e$, and an arithmetic circuit $13f$. The registers $13a, 13a, \ldots$ store the zero point deviations obtained from the corresponding weight sensors $CN_e, CN_e, \ldots, CN_e$.

The automatic zero adjusting circuit 13 operates in the following manner. When the signal $S_6$ arrives from the output of the second AND gate 6, the zero point deviation $D_i$ from the particular weight sensor $CN_e$ designated by the address signal ADR (FIG. 4) is set in the register $13a$ corresponding to this weight sensor to update the contents of the register. (In a case where the zero adjustment inhibit signal $S_2$ arrives from the flip-flop 9, however, none of the registers 13 is updated.) The result of updating the register is that, in an arithmetic combinatory control operation for providing the best combination, the zero point deviation $D_i$ stored in a register $13a$ is subtracted from the weight value $W_i$ of the articles measured by the corresponding weight sensor $CN_e$. In other words, a zero adjustment is automatically performed in which the difference obtained by subtracting $D_i$ from $W_i$ is delivered as the true measured value. This will now be described in further detail.

In accordance with the arithmetic combinatory operation, the counter $13b$ generates a pattern BTP of all possible $2^n - 1$ combinations. That is, for n-number of weighing hoppers (weight sensors), n combinations are possible when each combination is composed of one weighing hopper, $n(n-1)/2!$ combinations are possible when each combination is composed of two weighing hoppers, and, in general, $n(n-1)(n-2)\ldots(n-r+1)/r!$ combinations are possible when each combination is composed of r-number of weighing hoppers. Thus the total number of different combinations which can be formed is $2^n - 1$. Accordingly, if the n-bit binary counter $13b$ is made to count $2^n - 1$ timing pulses TP', then a total of $2^n - 1$ different bit patterns, from $000 \ldots 001$ to $111 \ldots 111$, will be generated. Then, if the first bit is made to correspond to the first weighing hopper, the second bit to the second weighing hopper, and the third through n-th bits to the third through n-th weighing hopper, then the bit pattern will be an indication of the above-mentioned combination pattern BTP. The combination pattern BTP is applied to the multiplexers $13d, 13e$, as illustrated in FIG. 5. The multiplexer $13d$ responds to the particular combination pattern BTP by selecting the specified zero point deviations $D_i$ stored in predetermined ones of the registers $13a$, these values of $D_i$ being delivered to the arithmetic circuit $13f$. Likewise, the multiplexer $13e$ also responds to this combination pattern BTP by selecting the specified read-outs (the weights of the articles) $W_i$ of predetermined ones of the weight sensors $CN_e$, these also being applied to the arithmetic circuit $13f$. For instance, when $n = 10$, assume that the combination pattern BTP is 1101010001. This means that the arithmetic circuit $13f$ will receive the outputs $W_1, W_2, W_4, W_6, W_{10}$ of the weight sensors $CN_e$ associated with the first, second, fourth, sixth and tenth weighing hoppers, and the zero point deviations $D_1, D_2, D_4, D_6, D_{10}$ of said weight sensors. The arithmetic circuit $13f$ is adapted to perform the subtractions $W_1 - D_1, W_2 - D_2, W_4 - D_4, W_6 - D_6, W_{10} - D_{10}$, and to send the results to a combinatory arithmetic unit, (not shown).

A single cycle proceeds as follows. When a weight sensor $CN_e$ which requires a zero adjustment is selected by the channel selection circuit 1, the zero point deviation $D_i$ from the selected weight sensor is applied to the comparators 2, 3. The comparators 2, 3 (FIG.3) compare the magnitude of the received zero point deviation $D_i$ with the preset allowable zero point deviation limits $-w$ grams and $+w$ grams. The comparator 2 produces a pulse when the zero point deviation $D_i$ is smaller than w grams, and the comparator 3 when the absolute value $|D_i|$ of the negative zero point deviation $D_i$ is smaller than w grams. When the zero point deviation $D_i$ which is the output, of the selected weight sensor, is within the range $-w$ to $+w$, therefore, the output $S_4$ of the first AND gate 4 goes to logical "1". This sends the output $S_5$ of OR gate 5 to logical "1", so that one input to the second AND gate 6 is high and one input to the third AND gate 7 low, by virtue of the inverter 8. When the comparison end signal $S_1$ (logical "1") arrives at the other input terminal of each of the AND gates 6, 7 under these conditions, the output $S_6$ of AND gate 6 goes high and the output $S_7$ of AND gate 7 goes low. The "1" logic from the second AND gate 6, namely signal $S_6$, clears the flip-flop 9 and the counter 10, so that the flip-flop 9 cannot produce the zero adjustment inhibit signal $S_2$. The automatic zero adjusting circuit 13 therefore executes a zero adjustment.

Assume now the converse situation wherein the zero point deviation $D_i$ from the weight sensor selected by the channel selection circuit 1 is outside the preset range of $-w$ grams to $+w$ grams determined by the comparators 2, 3. In such case only one of the two comparators will produce a pulse, sending the output $S_4$ of the first AND gate 4 to logical "0". The output $S_5$ of the OR gate 5 therefore also goes low, so that one input to the second AND gate 6 is low and one input to the third AND gate 7 high. When the comparison end signal $S_1$ (logical "1") arrives at the other input terminal of each of the AND gates 6, 7 under these conditions, the output $S_6$ of AND gate 6 goes low and the output $S_7$ of AND gate 7 goes high. The "1" logic from the third AND gate 7, namely signal $S_7$, sets the flip-flop 9. When this occurs, the zero adjustment inhibit signal $S_2$ appears at the set output terminal of the flip-flop and inhibits the instant zero adjustment while at the same time incrementing the counter 10.

It should be noted that it may be desired to perform the zero adjustment compulsorily even though the zero point deviation $D_i$ from the weight sensor is outside the range of $-w$ grams to $+w$ grams. This can be achieved by using a manual switch or the like to apply the OR gate 5 with a high level signal $S_8$ to assure that the output $S_5$ of OR gate 5 will be a "1" despite the low level output of AND gate 4. The high level of signal $S_5$ will initiate the zero adjustment.

When the zero point deviation from the channel selection circuit 1 has been subjected to the comparison operation in the manner described above followed by the subsequent processing which is based on the result of the comparison, the channel selection circuit 1 delivers the next zero point deviation on the basis of which the foregoing comparison operation and associated processing take place. This is repeated each time the channel selection circuit 1 delivers a zero point deviation $D_i$. When the content of counter 10 attains the numerical value N which has been preset in the preset switch 11, this is sensed by the comparison circuit 12 which responds by generating the alarm signal $S_3$. Note that setting N equal to one (N=1) makes it possible for the operator to be notified immediately of the fact that an article(s) is clinging to a weighing hopper.

Various modes of the present invention can be employed depending on the importance the user places on the characteristics of articles to be weighed, the weighing precision and productivity of the weighing apparatus.

The mode most frequently used is a method in which the set value N is equal to 1 (N=1), and if clinging of articles to be weighed should occur, an alarm is immediately produced to stop operation of the weighing apparatus for inspection and correction, after which operation restarts. This mode is employed when the importance is attached to the weighing precision. Where articles to be weighed have a very small viscosity so that at the time of succeeding discharge, residual articles to be weighed probably fall together with other articles to be weighed, the value is set as N=2, the zero adjustment is inhibited for once and the combination is again selected for discharge, after which judgement is made based on the output data to see if articles to be weighed still remain attached when instructions for the second zero adjustment are received. If they fallen (if zero displacement amount Di is $+W>Di>-W$), regular zero adjustment is made and the weighing operation proceeds. It is, of course, understood that if, in checking the output data of the second weight sensor $CN_e$, articles to be weighed still remain, an alarm is produced to stop operation of the weighing apparatus.

While the above-mentioned mode involves a drawback of performing a discharge of a light-weight portion for one cycle, it is noted that, at this time, zero adjustment is accomplished while articles to be weighed remain attached, to prevent more errors that would occur when weighings are carried out till some later zero adjustment, and after residual articles to be measured have been fallen in the succeeding discharge.

It will be noted that in weighing articles (such as sliced cheese) which have such a great viscosity that articles to be weighed are not peeled off with a minor shock and which has a large range of allowable error with respect to a target weight, a figure more than 2 can be used as N. This mode is employed when importance is attached to the operation in which weighting apparatus is not stopped, that is, to productivity, rather than to the weighing precision.

The foregoing description deals with a case where the invention is applied to a computer scale having an automatic zero adjustment apparatus. It should be noted, however, that the invention can also be applied to a case where a large number of discrete weighing machines having an automatic zero adjustment apparatus are arranged in a row and employed simultaneously. The invention can be applied to a single weighing machine having a zero adjustment apparatus by deleting the channel selection circuit 1.

The present invention as described and illustrated hereinabove is so arranged that when a weighing machine having an automatic zero adjustment apparatus is subjected to a zero adjustment, the variation in the zero point is investigated to determine whether it lies within preset limits. When it does lie within these limits the zero adjustment is allowed to proceed; when it does not the zero adjustment is inhibited. Accordingly, when an article is clinging to a weighing hopper gives rise to a significant shift in the zero point at the time of a zero adjustment, the zero adjustment is not allowed to occur. This makes it possible to prevent a significant shift in the zero point when, following a zero adjustment which is performed while articles are clinging to a weighing hopper, the articles are dislodged and fall from the hopper.

In another feature of the invention, an alarm is issued to notify the operator of an abnormality wherein an article clings to a weighing hopper without falling for a certain period of time, as indicated by the generation of a predetermined number (including just one) of zero adjustment inhibit signals.

As many apparently widely different embodiments of the present invention can be made without departing from the spirit and scope thereof, it is to be understood that the invention is not limited to the specific embodiments thereof except as defined in the appended claims.

What we claim is:

1. A method of controlling the zero adjustment of weight sensors for measuring the weight of articles, comprising the steps of:
    discriminating whether the zero point deviation of each weight sensor lies within preset allowed limits;
    applying a zero adjustment to each weight sensor when the zero point deviation thereof lies within said allowed limits and generating a signal for inhibiting the zero adjustment when the respective weight sensor zero point deviation lies outside of said allowed limits;
    counting a number of times the zero adjustment inhibit signal is generated; and
    comparing the counted value with a predetermined value and producing an alarm signal when said counted value and said predetermined value coincide.

2. A method according to claim 1, wherein said predetermined value is the numerical value one.

3. A method according to claim 1 or claim 2, wherein the step of applying the zero adjustment to each weight sensor comprises storing in a memory the zero point deviation of each weight sensor, and substracting said zero point deviation from the measured weight of the articles.

4. A method of controlling the zero adjustment of weight sensors in a combinatorial scale of the type which is adapted to measure, by means of said weight sensors which are provided on a plurality of respective weighing hoppers, the weight of articles introduced into said plurality of weighing hoppers, and selecting the combination or articles that gives a total weight closest to a set target weight, and discharging from the weighing hoppers the articles in said selected combination, said method comprising the steps of:

- counting a number of times the articles are discharged from each weighing hopper;
- discriminating whether each said discharge counted value has attained a first predetermined value;
- delivering a zero point deviation of the weight sensor provided on that weighing hopper for which said discharge counted value, which indicates the number of times the articles have been discharged therefrom, has attained said first prdetermined value;
- discriminating whether the zero point deviation of said weight sensor lies within preset allowed limits;
- applying a zero adjustment to said weight sensor when the zero point deviation thereof lies within said allowed limits and generating a signal for inhibiting the zero adjustment when said zero point deviation lies outside of said allowed limits;
- counting a number of times the zero adjustment inhibit signal is generated; and
- comparing said inhibit counted value with a second predetermined value to produce an alarm signal when said inhibit counted value and second predetermined value coincide.

5. A method according to claim 4, wherein the second predetermined value is the numerical value one.

6. A method according to claim 4 or claim 5, wherein the step of applying the zero adjustment to the weight sensor comprises storing in a memory the zero point deviation of said weight sensor, and subtracting said zero point deviation from the measured weight of the articles.

7. An apparatus for controlling a zero adjustment of weight sensors for measuring the weight of articles, comprising:

- zero adjusting means for applying a zero adjustment to each weight sensor;
- discriminating means for discriminating whether the zero point deviation of said each weight sensor lies within preset allowed limits;
- means for causing said zero adjusting means to apply a zero adjustment to said each weight sensor when the zero point deviation thereof lies within said allowed limits and for generating a zero adjustment inhibit signal for inhibiting the zero adjustment when said zero point deviation lies outside of said allowed limits;
- counting means for counting a number of times the zero adjustment inhibit signal is generated; and
- comparison means for comparing the counted value with a predetermined value to produce an alarm signal when said counted value and predetermined value coincide.

8. The apparatus according to claim 7, wherein said zero adjusting means comprises memory means for storing the zero point deviation of said each weight sensor, and arithmetic circuit means for subtracting said zero point deviation from the weight of the articles measured by said weight sensor.

9. An apparatus for controlling the zero adjustment of weight sensors in a combinatorial scale of the type for measuring, by means of said weight sensors which are provided on a plurality of respective weighing hoppers, the weight of articles introduced into said plurality of weighing hoppers, selecting the combination of articles that gives a total weight closest to a set target weight, and discharging from the weighing hoppers the articles in said selected combination, said apparatus comprising:

- zero adjusting means for applying a zero adjustment to each weight sensor;
- first counting means, provided for each weighing hopper, for counting a number of times the articles are discharged from said weighing hopper;
- first comparison means for discriminating whether said discharge counted value provided by said first counting means has attained a first predetermined value;
- selection means for selecting, when said counted value has attained said first predetermined value, the zero point deviation of the weight sensor provided on that weighing hopper which corresponds to the first counting means whose output is said discharge counted value;
- discriminating means for discriminating whether the selected zero point deviation lies within preset allowed limits;
- means for causing said zero adjusting means to apply a zero adjustment to said weight sensor when the zero point deviation thereof lies within said allowed limits and for generating a signal for inhibiting the zero adjustment when said zero point deviation lies outside of said allowed limits;
- counting means for counting the number of times the zero adjustment inhibit signal is generated; and
- second comparison means for comparing the said inhibit counted value with a second predetermined value to produce an alarm signal when said inhibit counted value and second predetermined value coincide.

10. An apparatus according to claim 9, wherein said zero adjusting means comprises memory means for storing the zero point deviation of each weight sensor, and arithmetic circuit means for substracting said zero point deviation from the weight of the articles measured by said weight sensor.

* * * * *